(12) United States Patent
Vaughn

(10) Patent No.: US 6,874,387 B2
(45) Date of Patent: Apr. 5, 2005

(54) QUICK RELEASE BICYCLE PEDAL MOUNTING CONNECTOR

(75) Inventor: Michael Joseph Vaughn, Stafford, CT (US)

(73) Assignee: Michael J. Vaughn, Stafford, CT (US)

( * ) Notice: Subject to any disclaimer, the term of this patent is extended or adjusted under 35 U.S.C. 154(b) by 218 days.

(21) Appl. No.: 10/135,028

(22) Filed: May 1, 2002

(65) Prior Publication Data

US 2003/0205103 A1 Nov. 6, 2003

(51) Int. Cl.$^7$ ................................................ G05G 1/14
(52) U.S. Cl. .................................... 74/594.1; 403/325
(58) Field of Search ........................... 74/594.1, 594.4, 74/594.5, 594.6, 594.7, 512, 560; 403/321, 322.1, 322.21, DIG. 6, DIG. 4, 325

(56) References Cited

U.S. PATENT DOCUMENTS

| | | | |
|---|---|---|---|
| 558,464 A | 4/1896 | Bascom | |
| 1,050,384 A | 1/1913 | Overton | |
| 2,536,466 A | 1/1951 | Rippenbein | |
| 3,851,890 A | * 12/1974 | Smith | ................... 279/75 |
| 3,888,136 A | 6/1975 | Lapeyre | |
| 4,169,686 A | * 10/1979 | Balensiefen et al. | .......... 403/12 |
| 4,198,080 A | * 4/1980 | Carpenter | .................. 285/277 |
| 4,290,617 A | * 9/1981 | Yoshida | ....................... 279/75 |
| 4,577,875 A | * 3/1986 | Miyakawa | .................... 279/75 |
| 4,850,245 A | 7/1989 | Feamster et al. | |
| 4,873,890 A | * 10/1989 | Nagano | .................... 74/594.4 |
| 5,312,125 A | * 5/1994 | Tsao | ........................... 280/287 |
| 5,315,896 A | 5/1994 | Stringer | |
| 5,363,721 A | 11/1994 | Hsiao | |
| 5,379,665 A | 1/1995 | Nagano | |
| 5,440,950 A | 8/1995 | Tranvoiz | |
| 5,464,229 A | * 11/1995 | Salpaka | ....................... 279/30 |
| 5,577,859 A | * 11/1996 | Nau | .......................... 403/325 |
| 5,586,472 A | 12/1996 | Lin | |
| 5,722,805 A | * 3/1998 | Giffin | ..................... 408/239 R |
| 6,059,296 A | * 5/2000 | Baeder | ....................... 279/20 |

OTHER PUBLICATIONS

Parker Fluid Connectors, 1998.*

* cited by examiner

*Primary Examiner*—Marcus Charles
*Assistant Examiner*—Julie K. Smith

(57) ABSTRACT

A quick release bicycle pedal mounting structure including a solid interchange plug connector connected to a crank and a female threaded manual connect coupling connected to a bicycle pedal. The quick release operates by manually pulling the spring (12) activated slide sleeve (9) on the connect coupling (3) perpendicular to the crank arm, which releases the ball bearings (11) into recesses within the connect coupling (3). Thereby allowing pedal (4) with attached connect coupling (3) to be easily detached from the plug connector (2), which is threaded into the crank arm (1).

1 Claim, 3 Drawing Sheets

US 6,874,387 B2

QUICK RELEASE BICYCLE PEDAL MOUNTING CONNECTOR

FIELD OF THE INVENTION

The present invention relates to a detachable bicycle pedal mounting structure, which permits the pedal to be removed quickly and easily from the crank. Uniquely, the pedal is removed manually by means of a quick disconnect coupling.

BACKGROUND AND SUMMARY OF THE INVENTION

Background

Bicycle pedals are typically attached to the crank by means of screw bolts and nuts. This pedal mounting method does not permit the user to quickly and easily remove the pedal from the crank assembly. Bicycle pedals currently are tooled directly to the crank assembly and require a tool to remove the pedal.

Bicycles are in worldwide use in recreation, exorcise and work and, in view of that, bicycle stacking, storage and transporting has increased and it is recognized that the pedal protrusion is an added encumbrance and often entangles with other bicycle parts during these activities. The pedals can scratch or deface surfaces on cars and walls during transport and storage.

Another example of pedal protrusion problems is when a bicycle gets a flat tire while being driven on the road and the rider must get off and walk along beside the bicycle until repair or other transport can be arranged. The bicycle pedal has a tendency to repeatedly strike the walker on the legs as he walks beside the disabled bicycle. Usually the tools necessary for standard bicycle pedal removal are not at hand in this instance.

Bicycles without pedals have a reduced theft risk because a thief will have difficulty riding the bicycle away. In addition bicycle pedals have become expensive with recent interest in custom designed racing pedals and these pedals need convenient protection from theft.

INCORPORATED MATERIAL

Heretofore, bicycle pedal mechanisms have been designed with somewhat impractical solutions to the above problems. The following U.S. patents are herein incorporated by reference for pertinent and supporting information:

U.S. Pat. No. 5,586,472, is a detachable bicycle pedal mounting structure that requires a specialized hexagonal pedal shaft and in making the connection a small locking piece is required for stability. Small pieces are easily lost.

U.S. Pat. No. 5,440,950, is a detachable shaft such as a pedal shaft which again requires a special shaft and pedal combination. Also in many of the designs there are small parts required to complete the connections.

U.S. Pat. No. 5,379,665 is a bicycle pedal designed for a crank arm, but again the design is limited to a specialized bicycle pedal. The design precludes the use of standard bicycle pedals.

U.S. Pat. No. 5,363,721 is a bicycle pedal crank dismounting device which removes the entire crank arm from the bicycle and is more than required to address the problems discussed above.

U.S. Pat. No. 5,315,896 is a quick release bicycle pedal which requires a hollow shaft pedal to make the connections possible. This design requires pedal retrofits to be adaptable to the crank connector.

U.S. Pat. No. 4,873,890 is a pedal for a bicycle which is dedicated to the pedal movement around the pedal shaft, U.S. Pat. No. 4,850,245 is a bicycle crank and pedal structure which focuses on the adjustable crank length.

U.S. Pat. No. 3,888,136 is an adjustable pedal and crank system for foot propelled vehicles which provides for adjusting the length of the crank arm.

U.S. Pat. No. 2,536,466 is a folding pedal yoke that permits the pedal to be attached to the crank arm.

U.S. Pat. No. 1,050,384 is a pedal for motor cycles that describes the basic pedal design that still exist today with modern variations.

U.S. Pat. No. 558,464 is a bicycle pedal attachment designed to give the user a mechanical advantage over the standard attachment.

For purpose of providing additional background material which may demonstrate the state of the art, the following sales literature printouts from websites is herein incorporated by reference: by Speedway Pedals at www.speedplay.com, by Webcyclery at www.webcyclery.com and Bike Parts USA at www.bikepartsusa.com, which illustrate the various specialty bike pedals and related equipment for sale.

SUMMARY

The present invention has been consummated to provide a detachable bicycle pedal mounting structure which permits the user to quickly detach the pedal from the crank. According to the preferred quintessence of the present invention, the detachable bicycle pedal mounting connector structure comprises an interchange plug connector connected to the crank, a quick disconnect manual connect type coupling threaded on the opposite end of the disconnect so as to accept the threaded bicycle pedal shaft, thereby in the assembled state permitting the pedal to be quickly removed from and returned to the crank connector. The invention is intended to provide a cost-effective solution to the problems outlined in the background.

DETAILED DESCRIPTION OF THE ILLUSTRATED EMBODIMENT

Figure 1:
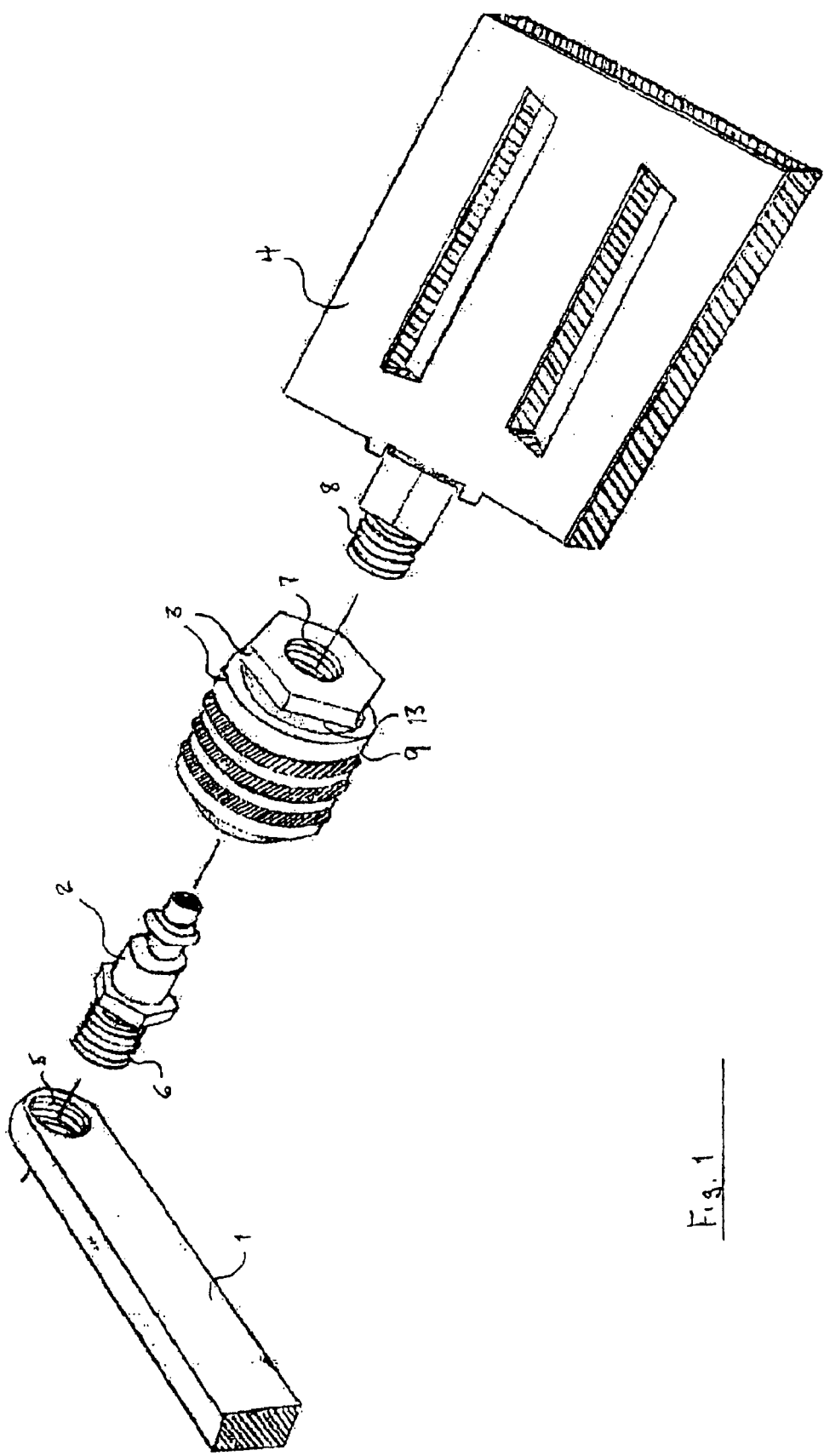
FIG. 1 is an exploded view of a quick release bicycle pedal mounting connector structure according to the present invention.
Figure 2:
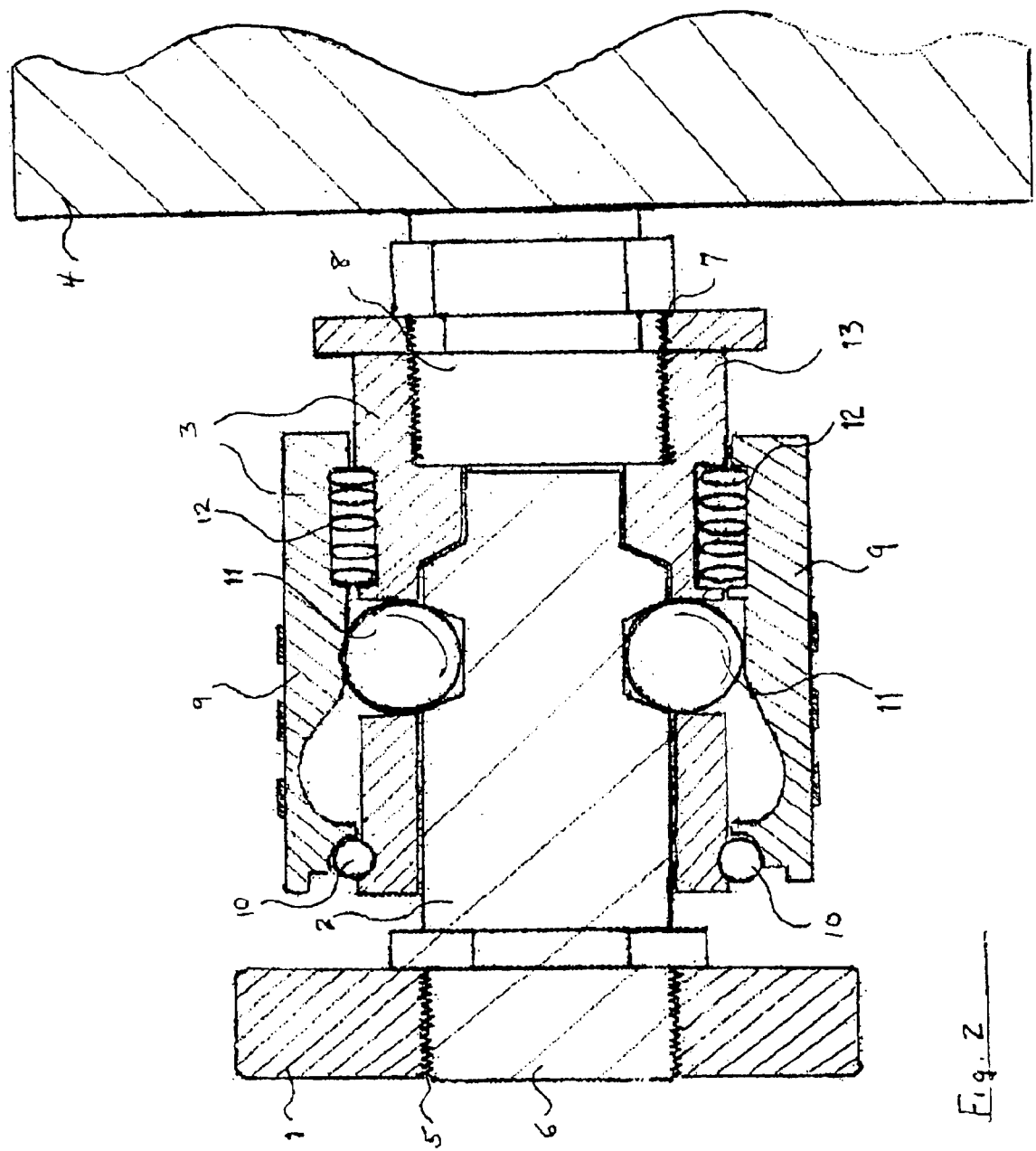
FIG. 2 shows a cross sectional view of the connector between the crank and the pedal shaft according to the present invention.
Figure 3:
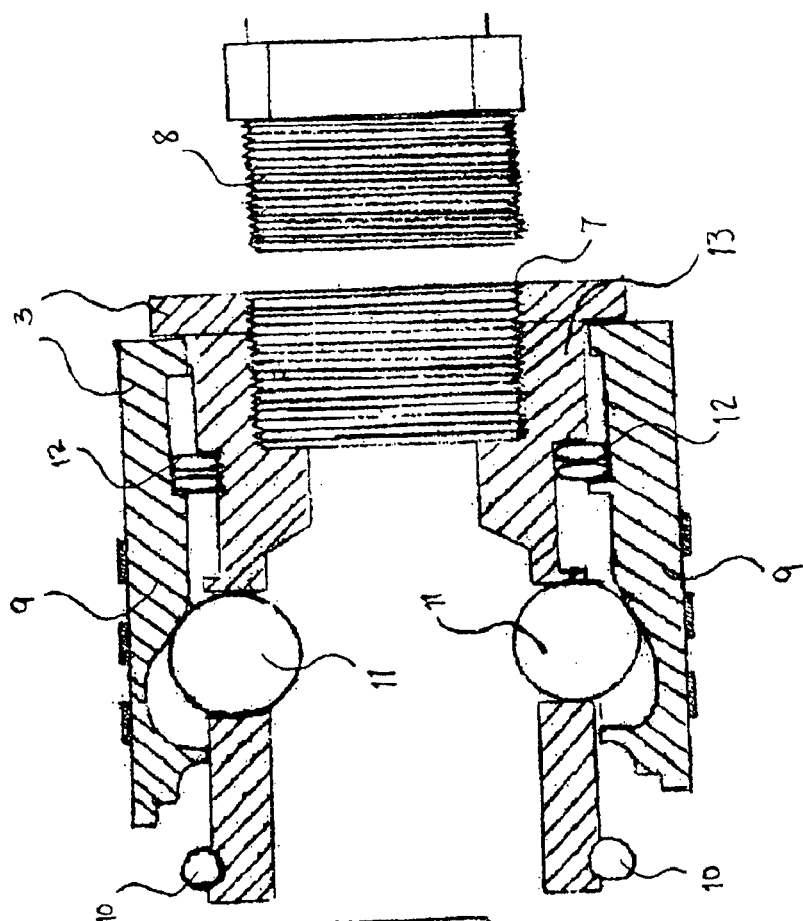
FIG. 3 shows a cross sectional view of the connector assembly disassembled according to the present invention.

Referring to FIGS. from 1 to 3, a detachable, quick release bicycle pedal mounting structure in accordance with the present invention is generally comprised of a crank 1, a male threaded pedal 4, a male threaded solid interchange plug connector 2, and a female threaded manual connect coupling 3 connected between the crank 1 and the pedal 4. The crank 1 has a female threaded screw hole 5 for screw connecting the plug 2. The plug 2 comprises a male threaded end 6 and has a hexagonal cross section at the thread end extending along the plug axis and reverting back to a smooth cylindrical shape with a locking indent annular groove created by reducing the plug diameter and then restoring and reducing the plug diameter along the plug axis. The plug 2 seats inside the manual connect coupling 3 interior casing 13 and is locked in position by ball bearings 11 that lock in the plug 2 locking indent. The ball bearings 11 lock and release mechanism is controlled by the slide sleeve 9 on the exterior portion of the manual connect coupling 3. The slide sleeve 9 is manually pulled back along the plug 2 axis in the direction of the bicycle pedal 4 and the springs 12 contract. The ball bearings 11 are then free to float within the coupling 3 interior casing 13 and the plug 2 may be released or reconnected. The slide sleeve 9 is released and the spring 12 tension forces the slide sleeve 9 forward along the plug axis to the retainer ring 10 and locks the ball bearings 11 in position in the plug 2 locking indent. The bicycle pedal 4 has a male threaded shaft 8 that is screwed into the threaded female end 7 of the manual connect coupling 3. The action of manually pulling the slide sleeve 9 on the manual connect coupling 3 permits the bicycle pedal 4 to be quickly connected or disconnected from the plug 2.

What is claimed and desired to be secured from the United States Patent is:

1. A detachable bicycle pedal mounting structure comprising:

a crank having a screw hole at one end, a pedal having a shaft spindle equipped with a male thread, a solid plug connector having a male threaded portion at a first end, and a quick release manual connect coupling arranged along an axis of said crank screw hole, the male threaded portion at the first end of said plug connector being threaded into said screw hole of said crank, said plug connector adjacent the male threaded portion having a hexagonal cross section extending along a plug axis and reverting back to a smooth cylindrical shape with a locking indent annular groove created by reducing and restoring and reducing again the plug diameter along the plug axis, said plug connector interconnecting with the quick release manual connect coupling by manually pulling a spring activated slide sleeve of the coupling along said plug axis away from said crank, thereby permitting locking ball bearings within said coupling to move freely within said coupling into and out of the locking indent groove of the plug connector, and also permitting entrance and exit capability of the plug connector into and out of the coupling, said plug being locked into position by releasing the slide sleeve allowing spring tension to force said slide sleeve back along said plug axis toward said crank and to stop and hold at a retainer ring, said slide sleeve thereby forcing said ball bearings into a locking position within said coupling, said coupling thereby clasping the plug connector, said coupling having a female threaded hole being connected to the male threaded shaft spindle of the pedal thereby permitting the pedal to be detachable by means of manually pulling said coupling slide sleeve.

* * * * *